US008250119B2

(12) United States Patent
Zàzrivec et al.

(10) Patent No.: US 8,250,119 B2
(45) Date of Patent: Aug. 21, 2012

(54) DATABASE SCHEMA UPGRADE VALIDATION USING DENORMALIZATION

(75) Inventors: Milan Zàzrivec, Brno (CZ); Jan Pazdziora, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 170 days.

(21) Appl. No.: 12/713,919

(22) Filed: Feb. 26, 2010

(65) Prior Publication Data
US 2011/0213759 A1 Sep. 1, 2011

(51) Int. Cl.
G06F 7/00 (2006.01)
(52) U.S. Cl. ........................................................ 707/806
(58) Field of Classification Search .................. 707/802, 707/803, 806, 809
See application file for complete search history.

(56) References Cited

U.S. PATENT DOCUMENTS

| | | | | |
|---|---|---|---|---|
| 5,717,924 | A | * | 2/1998 | Kawai ................................... 1/1 |
| 2004/0019586 | A1 | * | 1/2004 | Harter ............................... 707/1 |
| 2006/0020619 | A1 | * | 1/2006 | Netz et al. ...................... 707/102 |
| 2008/0077632 | A1 | | 3/2008 | Tysowski et al. |
| 2011/0093469 | A1 | * | 4/2011 | B'Far et al. .................... 707/741 |

OTHER PUBLICATIONS

"Denormalization", accessed at: http://en.wikipedia.org/wiki/Denormalization on Feb. 11, 2010, last updated Feb. 10, 2010, 2 pages.
"Materialized View", accessed at: http://en.wikipedia.org/wiki/Materialized_view on Feb. 11, 2010, last updated Nov. 13, 2009, 1 page.
"Database Normalization", accessed at: http://en.wikipedia.org/wiki/Database_normalization on Feb. 11, 2010, last updated Feb. 2, 2010, 10 pages.
"SQL Create View Statement", accessed at: http://infogoal.com/sql/sql-create-view.htm on Feb. 18, 2010, 2 pages.
Oracle Database Concepts, 11g Release 2 (11.2) Part No. E10713-05, Tables and Table Clusters, accessed at: http://download.oracle.com/docs/cd/E11882_01/server.112/e10713/tablecls.htm on May 27, 2010, 32 pages.
Red Hat, Inc. Non-Final Office Action for U.S. Appl. No. 12/789,209 (P732), mailed Jan. 24, 2012.

* cited by examiner

Primary Examiner — Amy Ng
(74) Attorney, Agent, or Firm — Lowenstein Sandler PC

(57) ABSTRACT

Some embodiments of a system and a method to validate database schema upgrade using denormalization have been presented. For instance, a database deployment engine may upgrade a database from a first version to a second version. The database upgraded stores a set of entities. By applying denormalization to both the upgraded database and a reference database (which contains a newly installed second version of the database), a database validation engine may reduce false positives during validation of the database schema upgrade scripts usable by customers to upgrade their database schema to the latest version.

15 Claims, 5 Drawing Sheets

TABLE OF COUNTRIES
210

1 US
2 CZ
3 FR
4 UK

TABLE OF PARCEL COMPANIES
220

1 DHL
2 UPS
3 USPS
4 PPL

FIG. 2A

RELATIONSHIP TABLE
230

232

231
1 1
1 3
1 2
2 1
2 4
3 1
4 1
4 2
4 3

RELATIONSHIP VIEW
240

US DHL
US USPS
US UPS
CZ DHL
CZ PPL
FR DHL
UK DHL
UK USPS
UK UPS

FIG. 2B

TABLE OF PARCEL COMPANIES — 225

2 USPS
5 DHL
7 PPL
8 UPS

FIG. 2C

TABLE OF COUNTRIES — 215

12 FR
34 US
41 UK
52 CZ

RELATIONSHIP TABLE — 235

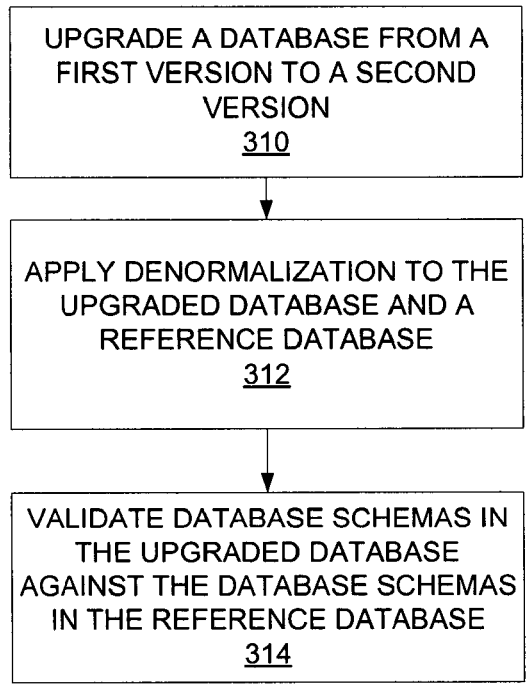
FIG. 3A
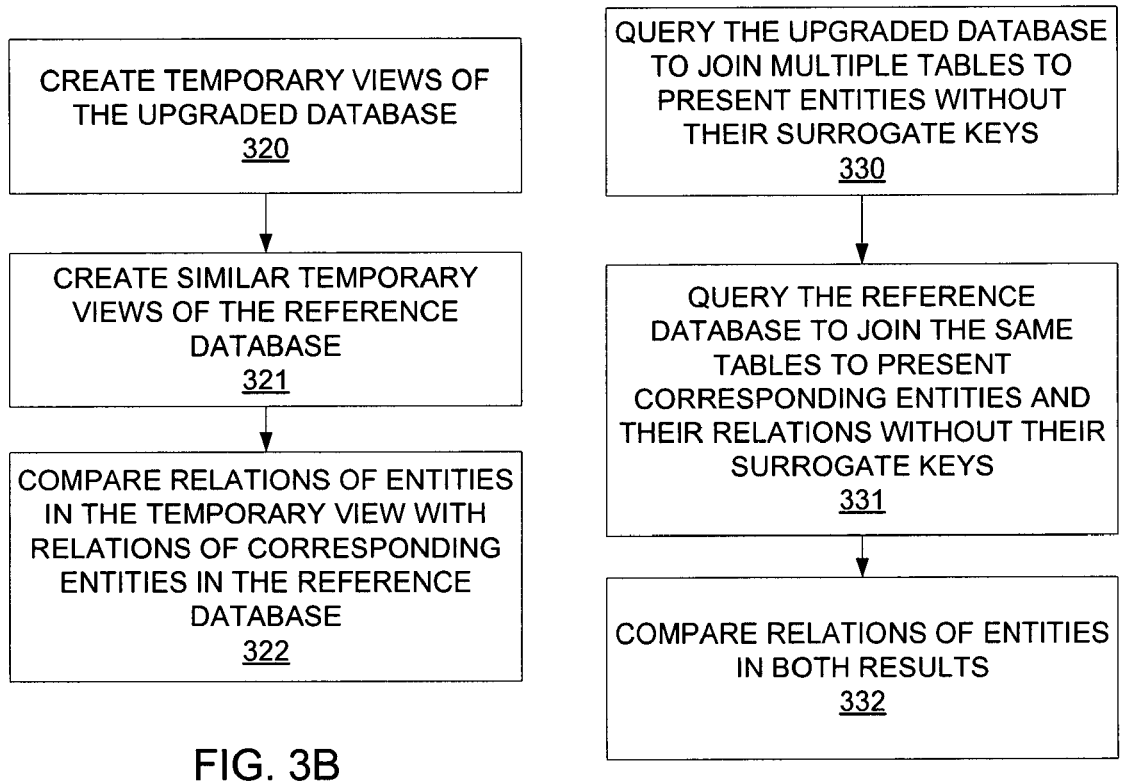
FIG. 3B
FIG. 3C

# US 8,250,119 B2

DATABASE SCHEMA UPGRADE VALIDATION USING DENORMALIZATION

TECHNICAL FIELD

Embodiments of the present invention relate to databases, and more specifically to database schema upgrade validation.

BACKGROUND

In a typical enterprise installation, application software as well as the database schema used by the application is maintained for many years without fresh reinstallations. Upgrades are applied to the software and to the supporting database schema to keep the application up-to-date with the latest version produced by the software vendor. Unlike with the software where new versions of the programs simply replace the old ones upon upgrade, upgrading the database schema is much more delicate. The database schema upgrade scripts need to ensure that the upgraded database schema matches exactly the expectations of the relevant version of software application, not only in the database object definitions, but also for content of database tables, especially for entities that are essential for the correct operation of the application software.

When developing the database schema upgrade scripts, it is essential to validate that when applied to the old database schema, the result matches the database schema is created by fresh installation. Conventionally, an iterative approach is used when comparing content of a newly installed database schema (also referred to as a reference) with the content of an old database schema, upgraded with the database schema upgrade scripts to the latest version. If the content is the same, then the database schema upgrade scripts are validated. On the other hand, if the content is not the same, then the database schema upgrade scripts have to be checked and additional instructions, such as INSERT, UPDATE, etc., may have to be added. As database schema is highly normalized, with extensive use of static lookup tables and dynamic look up tables (which may be referred to as registry tables), the same entity may be represented with records with different synthetic primary identifiers in each schema, depending on the order of actions that have been made in the system and upgrade history of the application and its database schema. This yields a large number of false positives in the output of conventional database schema validation tools. Currently, these false positives have to be processed manually.

BRIEF DESCRIPTION OF THE DRAWINGS

The present invention is illustrated by way of example, and not by way of limitation, in the figures of the accompanying drawings and in which:

FIGS. 2A-2D illustrate some embodiments of database tables and database views.

FIG. 3A illustrates a flow diagram of one embodiment of a method to validate database schema upgrade.

FIGS. 3B-3C illustrate flow diagrams of various embodiments of a method to apply normalization in database schema upgrade validation.

DETAILED DESCRIPTION

Figure 1:
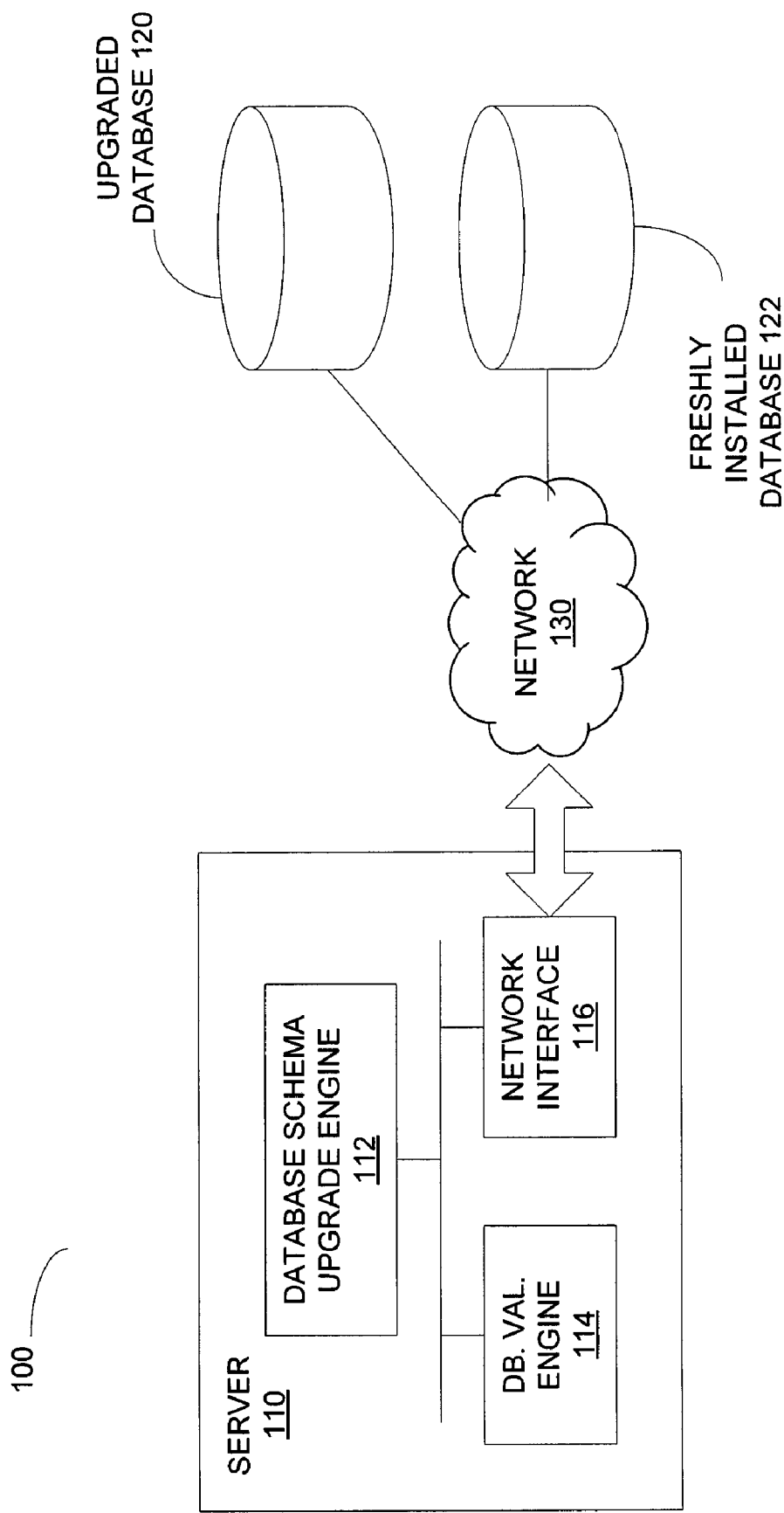
FIG. 1 illustrates one embodiment of a computing system usable in some embodiments of the invention.

Described herein are some embodiments of a method, an apparatus, and a system to validate database schema upgrade using denormalization. In some embodiments, database schema upgrade validation is done during development of database schema upgrade scripts. Specifically, a database schema upgrade engine may upgrade the schema of a database from a first version to a second version. The database schema stores a set of entities and a set of relations of the entities. Using denormalization of the database, a database validation engine may reduce false positives during validation of the entities and the relations after the upgrade. For instance, the database validation engine may denormalize the database by creating temporary views of the database before comparing the relations of the entities. By denormalizing the database, the database validation engine can ignore surrogate keys associated with the entities and the relations. Because the surrogate keys may very likely differ between the upgraded database schema and a freshly installed database schema of the second version (which may be considered as a reference database schema), ignoring the surrogate keys during validation may help to reduce false positives in validation. More details of some embodiments of how to validate database schema upgrade using denormalization are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "upgrading" or "validating" or "disregarding" or "comparing" or "creating" or "executing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 4:
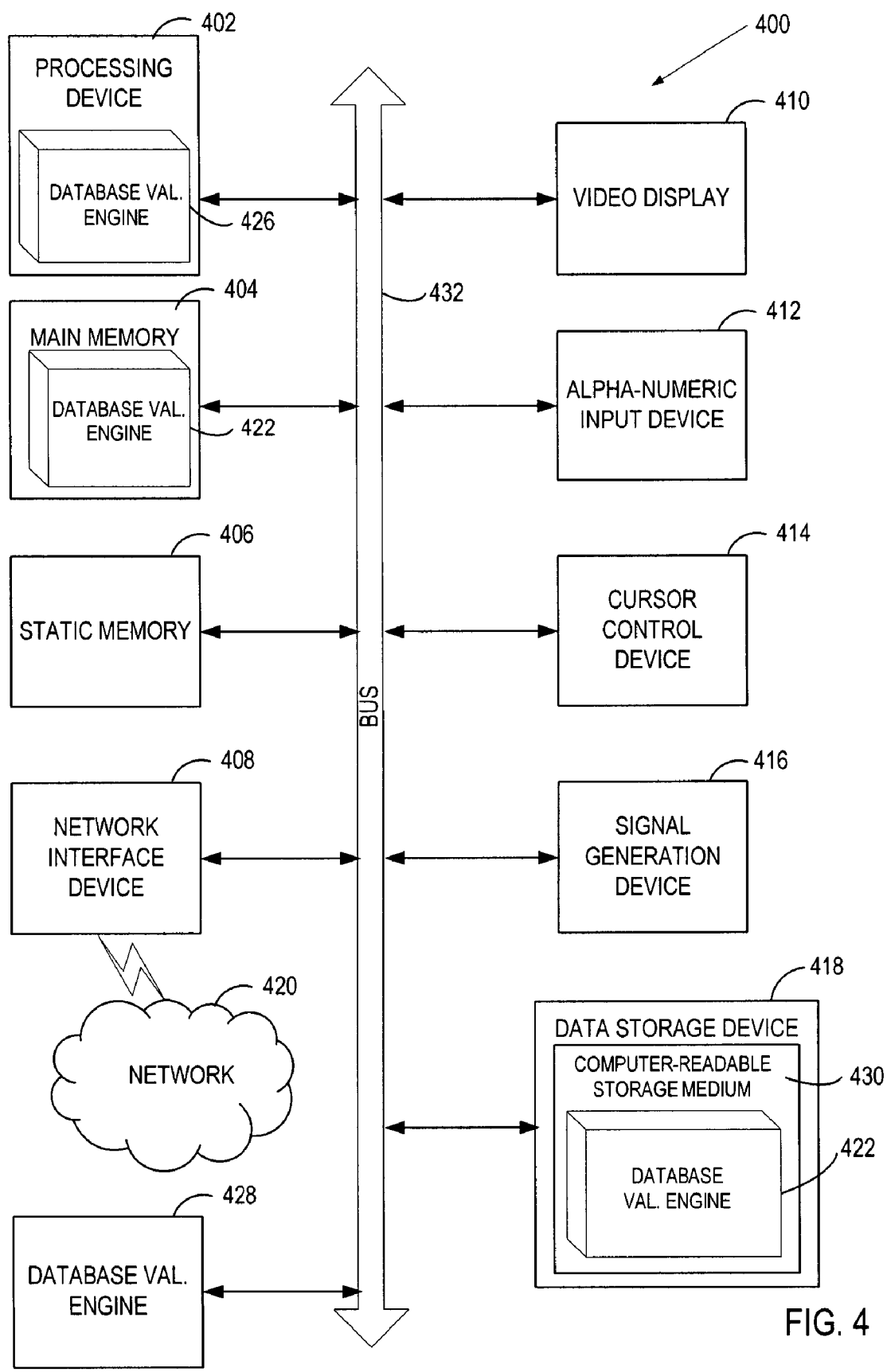
FIG. 4 illustrates a block diagram of an exemplary computing system.

FIG. 1 illustrates one embodiment of a computing system usable in some embodiments of the invention. The computing system 100 includes a server 110 and two databases 120 and 122. In some embodiments, the server 110 and the databases 120 and 122 are coupled to a network 130 such that the server 110 can access both databases 120 and 122. The server 110 may be implemented on one or more computing machines, such as a desktop personal computer, a laptop computer, a personal digital assistant, etc. Details of one example of a computing machine are illustrated in FIG. 4. The network 130 may include various types of network, such as, for example, a public network (e.g., the Internet), a private network (e.g., a local area network), a wireless network, a wire-lined network, etc. In the current example, database 120 stores a first version of a database schema to be upgraded to a second version, whereas database 122 stores a freshly installed database schema of the second version. The freshly installed database schema may also be referred to as a reference database schema because it can be used to validate the upgraded database schema as explained in details below.

In some embodiments, the server 110 includes a database schema upgrade engine 112, a database validation engine 114, and a network interface 116, coupled to each other. The database schema upgrade engine 112 is operable to deploy a schema upgrade to an existing database, or to install a fresh copy of a database schema. The database validation engine 114 is operable to validate a database schema upgrade. The network interface 116 is usable to access the network 130. In some alternate embodiments, the server 110 may further include one or more internal storage devices (e.g., hard disks) to store at least part of the databases 120 and 122. To further explain the operations of the server 110, some examples are discussed in details below.

In some embodiments, each of the databases 120 and 122 includes a relational database having some tables and database objects. The database objects may include entities having various attributes and relations between the entities. The entities, their attributes and their relations may be arranged in some predefined data structure referred to as a schema. For example, a schema may define tables and fields used in a database to store some of the entities, their attributes, and their relations. In some database tables, entities with exactly defined attributes have to be present to ensure proper functioning of applications that use the database. The same may hold true for the relations. Therefore, the database validation engine 114 has to validate the database schemas of the upgraded database 120. In some embodiments, the database validation engine 114 compares the relations of the entities in the database schema of the upgraded database 120 with the relations of the corresponding entities in the database schema of the reference database 122. If there is a difference between the relations in the two database schemas, the database validation engine 114 may output the difference (e.g., displaying the difference on a terminal coupled to the server 110, writing the difference into a log file, etc.).

For highly normalized database schemas, entities in a database table may be associated with surrogate keys, which are internal identifiers pointing to other tables in the database. For instance, the internal identifiers may be integers assigned to the entities as the entities are entered into the table during operation of the database. FIG. 2A illustrates some examples of such database tables storing a list of countries and a list of parcel companies in the reference database 122. The table 210 can be used to store countries used by a shipping application. The other table 220 can be used to store parcel companies used by the shipping application. In the current example, tables 210 and 220 have been pre-populated with countries and parcel companies, respectively, in the reference database 122. For example, 1 is assigned to United States, 2 is assigned to Czech Republic, 3 is assigned to France, and so forth. The surrogate keys may be used in other tables within the reference database 122 to refer to the countries to avoid storing multiple strings representing the same country. FIG. 2B illustrates an example of another table using the surrogate keys of tables 210 and 220. The table 230 in FIG. 2B shows which parcel company can be used to ship to which country. Column 231 in table 230 stores surrogate keys of countries and column 232 in table 230 stores surrogate keys of parcel companies. Thus, the content in table 230 is a normalized representation of the information in the relationship view 240 in FIG. 2B, which stores strings representing countries and parcel companies instead. Note that the relation table 230 contains only the surrogate key pairs, such as (1, 1), (1, 3), etc., and the surrogate keys could be completely different in the upgraded database schema. One embodiment of the corresponding table of countries and table of parcel companies in the upgraded database schema are shown in FIG. 2C. Table 215 and table 225 store the corresponding countries and parcel companies, respectively, in the upgraded database 120. Note that the surrogate keys of the countries in table 215 are different from those in table 210. Likewise, the surrogate keys of the parcel companies in table 225 are different from those in table 220. The upgraded database 120 further includes a relationship table as shown in FIG. 2D. The relationship table 235 in FIG. 2D contains a column 236 storing surrogate keys of countries and another column 237 storing surrogate keys of parcel companies in the upgraded database 120. The entries in table 235, such as (34, 5), (34, 8), etc., are different from those in table 230 in FIG. 2B, but they nevertheless represent the same information. In the current example, what really matters is that for US, there are DHL, USPS, and UPS listed, not which surrogate keys are used. In some embodiments, the relation table can include additional columns to represent more complicated relationships. In the current example, on the upgraded database 120, US could have an internal surrogate key 34, and DHL could have an internal surrogate key 5 as shown in FIG. 2C.

Thus, the entries of surrogate keys would be different between the upgraded database schema and the reference database schema. But in order to correctly validate the upgraded database schema, the database validation engine 114 has to ensure that, for example, the entry of (US, USPS) is seen by the shipping application when it does the lookup or join, but not (CZ, USPS).

In order to ensure the shipping application to work correctly with the upgraded database 120, the database validation engine 114 has to verify that not only the values in both tables 210 and 215, as well as the values in both tables 220 and 225, are the same, but that the semantic of relationship table 230 matches the one from the upgraded schema (i.e., table 235). Note that the order and the surrogate keys of the countries may be different in databases 120 and 122, but such differences may not cause applications that use the databases 120 and 122 to function incorrectly. This is because these surrogate keys are the internal representation, while what matters is the semantic of those values. Therefore, to properly validate the database schema upgrade, the surrogate keys should be ignored in order to reduce false positives in the validation.

To do so, the database validation engine 114 may apply denormalization to the databases 120 and 122. In one embodiment, the database validation engine 114 creates temporary views of the databases 120 and 122, which contain the relations of the entities without their surrogate keys. One embodiment of a temporary denormalized view of the table 230 is illustrated in FIG. 2B. Note that the temporary denormalized view 240 contains the (country, parcel company) relationship described by the names of those entities, without their surrogate keys. Then the database validation engine 114 compares the relations of entities (such as which parcel company can be used to ship to which country) in these temporary denormalized views of the databases 120 and 122 to determine if there is any difference in these relations between the two databases 120 and 122.

Alternatively, the database validation engine 114 may query each of the databases 120 and 122 to obtain results that present the relations of the entities to be compared without their surrogate keys. Then the database validation engine 114 may compare the results in order to validate the relations in the upgraded database 120.

The approach in the above paragraph allows incorporation of the temporary database views into validation in a plugin fashion. When the database validation engine 114 finishes comparing the entities and above all, their relations, the temporary database views may be dropped. By hiding the surrogate keys, and hence, ignoring the surrogate keys when comparing the relations of the entities, false positives can be reduced in validating upgraded database schemas. As a result, the need for manual intervention in validation can be decreased, and the scope of upgraded schema validation can be extended. Furthermore, the above approach using direct queries may be usable in situations where creating new database objects might not be possible, especially in read-only environments.

FIG. 3A illustrates a flow diagram of one embodiment of a method to validate database schema upgrade. The method may be performed by processing logic that may comprise hardware (e.g., circuitry, dedicated logic, programmable logic, microcode, etc.), software (such as instructions run on a processing device), firmware, or a combination thereof. For instance, the server 110 illustrated in FIG. 1 may perform at least part of the method in some embodiments.

Initially, processing logic upgrades a database from a first version to a second version (processing block 310). In some embodiments, one or more applications have been using the first version of the database. Furthermore, the applications may have entered some entities into the database since then.

In some embodiments, processing logic applies denormalization to the upgraded database and a reference database (processing block 312). The reference database contains a freshly installed database of the second version. Some embodiments of denormalization are discussed in more details below. Then processing logic validates database schemas in the upgraded database against the database schemas of the reference database (processing block 314). By denormalizing the database, surrogate keys of entities can be ignored in validation, thus, reducing the chance of having false positives in validation. Further, processing logic reports results of the validation to a user, such as a system administrator (e.g., in a user interface, via a message, etc.).

FIG. 3B illustrates a flow diagram of one embodiment of a method to apply normalization in database schema upgrade validation. The method may be performed by processing logic that may comprise hardware (e.g., circuitry, dedicated logic, programmable logic, microcode, etc.), software (such as instructions run on a processing device), firmware, or a combination thereof. For instance, the server 110 illustrated in FIG. 1 may perform at least part of the method in some embodiments.

Initially, processing logic creates temporary views of the upgraded database (processing block 320). For example, processing logic may use CREATE VIEW command in Sequential Query Language (SQL) to create a temporary view of the upgraded database to present only the relations of the entities of interest, without the surrogate keys of these entities. Processing logic further creates similar temporary views of the reference database (processing block 321). Then processing logic compares the relations in the temporary views of the upgraded database with the corresponding relations in the temporary views of the reference database (processing block 322).

FIG. 3C illustrates a flow diagram of an alternate embodiment of a method to apply normalization in database schema upgrade validation. The method may be performed by processing logic that may comprise hardware (e.g., circuitry, dedicated logic, programmable logic, microcode, etc.), software (such as instructions run on a processing device), firmware, or a combination thereof. For instance, the server 110 illustrated in FIG. 1 may perform at least part of the method in some embodiments.

Initially, processing logic queries the upgraded database to join multiple tables to obtain a result containing the relations of the entities of interest only, without their surrogate keys (processing block 330). For example, the entities of interest may include countries to which products are shipped and parcel companies available. Then processing logic may submit multiple direct queries (e.g., SELECT in SQL) to obtain a result containing countries and parcel companies, but not the surrogate keys associated with the countries and parcel companies. Next, processing logic queries the reference database to join the same tables to obtain a result containing the corresponding relations of the corresponding entities without their surrogate keys (processing block 331). Then processing logic compares the relations in both results to check for differences (processing block 332). If there is no difference, then the database schema upgrade scripts are validated. Otherwise, changes need to be made in the database schema upgrade scripts and validation is repeated on the changed scripts.

FIG. 4 illustrates a diagrammatic representation of a machine in the exemplary form of a computing system 400 within which a set of instructions, for causing the machine to perform any one or more of the methodologies discussed herein, may be executed. In alternate embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 432.

Processing device 402 represents one or more general-purpose processing devices such as a microprocessing device, a central processing unit, or the like. More particularly, the processing device may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. Processing device 402 may also be one or more special-purpose processing devices such as an application specific integrated circuit (ASIC), a field programmable gate array (FPGA), a digital signal processing device (DSP), network processing device, or the like. The processing device 402 is configured to execute the database validation engine 426 for performing the operations and steps discussed herein.

The computing system 400 may further include a network interface device 408. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-accessible storage medium 430 (also known as a computer-readable storage medium) on which is stored one or more sets of instructions (e.g., database validation engine 422) embodying any one or more of the methodologies or functions described herein. The database validation engine 422 may also reside, completely or at least partially, within the main memory 404 and/or within the processing device 402 during execution thereof by the computing system 400, the main memory 404 and the processing device 402 also constituting computer-accessible storage media. The database validation engine 422 may further be transmitted or received over a network 420 via the network interface device 408.

While the computer-readable storage medium 430 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The database validation engine 428, components and other features described herein (for example, in relation to FIG. 1) can be implemented as discrete hardware components or integrated into the functionalities of hardware components, such as ASICS, FPGAs, DSPs, or similar devices. In addition, the database validation engine 428 can be implemented as firmware or functional circuitries within hardware devices. Further, the database validation engine 428 can be implemented in any combination of hardware devices and software components.

Thus, some embodiments of a system and a method to validate database schema upgrade using denormalization have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    upgrading, by a processing device executing a database schema upgrade script, a database schema of a database from a first version to a second version, the database storing a plurality of entities;
    creating, by the processing device, temporary denormalized views of each of the second version of the database and a reference database, the temporary denormalized views each comprising relations of a plurality of entities in the corresponding database without surrogate keys of the plurality of entities, wherein the reference database comprises a newly installed database of the second version; and
    validating, by the processing device, the plurality of entities and the relations of the plurality of entities, the validating comprising:
        comparing the plurality of entities in the temporary denormalized views for differences; and
        comparing the relations of the plurality of entities in the temporary denormalized views to reduce false positives during validation of the database schema upgrade script.

2. The method of claim 1, wherein comparing the relations of the plurality of entities in the temporary denormalized views further comprises:
    executing, by the processing device, a set of one or more queries against the upgraded database to produce a result comprising the plurality of entities and relations of the plurality of entities, without surrogate keys of the plurality of entities; and
    comparing, by the processing device, the relations of the plurality of entities in the result with relations of a corresponding plurality of entities in the reference database.

3. The method of claim 1, wherein a first plurality of surrogate keys of the plurality of entities in the database after the upgrading are out of sync with a second plurality of surrogate keys of a corresponding plurality of entities in the reference database.

4. The method of claim 1, wherein at least one of the plurality of entities is created after installation of the first version of the database, and before the upgrading of the database to the second version.

5. The method of claim 1, wherein the database comprises a relational database.

6. An apparatus comprising:
a memory;
a processing device communicably coupled to the memory;
a database schema upgrade engine executable from the memory by the processing device, the database schema upgrade engine configured to upgrade a database schema of a database from a first version to a second version, the database storing a plurality of entities; and
a database validation engine executable from the memory by the processing device, the database validation upgrade engine configured to:
create temporary denormalized views of each of the second version of the database and a reference database, the temporary denormalized views each comprising relations of a plurality of entities in the corresponding database while disregarding surrogate keys of the plurality of entities, wherein the reference database comprises a newly installed database of the second version; and
validate the plurality of entities and the relations of the plurality of by:
comparing the plurality of entities in the temporary denormalized views for differences; and
comparing the relations of the plurality of entities in the temporary denormalized views to reduce false positives during validation of the database schema upgrade script.

7. The apparatus of claim 6, wherein the database validation engine is further configured to:
execute a set of one or more queries against the upgraded database to produce a result comprising the plurality of entities and relations of the plurality of entities, but without surrogate keys of the plurality of entities; and
compare the relations of the plurality of entities in the result with relations of a corresponding plurality of entities in the reference database.

8. The apparatus of claim 6, wherein the surrogate keys of the plurality of entities in the database after the upgrading are out of sync with a second plurality of surrogate keys of a corresponding plurality of entities in the reference database.

9. The apparatus of claim 6, wherein at least one of the plurality of entities is created after installation of the first version of the database, and before the upgrading of the database to the second version.

10. The apparatus of claim 6, wherein the database comprises a relational database.

11. A non-transitory computer-readable storage medium embodying instructions that, when executed by a processing device, will cause the processing device to perform a method comprising:
executing a database schema upgrade script to upgrade a database schema of a database from a first version to a second version, the database storing a plurality of entities;
creating, by the processing device, temporary denormalized views of each of the second version of the database and a reference database, the temporary denormalized views each comprising relations of a plurality of entities in the corresponding database without surrogate keys of the plurality of entities, wherein the reference database comprises a newly installed database of the second version; and
validating, by the processing device, the plurality of entities and the relations of the plurality of entities, the validating comprising:
comparing the plurality of entities in the temporary denormalized views for differences; and
comparing the relations of the plurality of entities in the temporary denormalized views to reduce false positives during validation of the database schema upgrade script.

12. The non-transitory computer-readable storage medium of claim 11, wherein the method further comprises:
executing a set of one or more queries against the upgraded database to produce a result comprising the plurality of entities and relations of the plurality of entities, without surrogate keys of the plurality of entities; and
comparing the relations of the plurality of entities in the result with relations of a corresponding plurality of entities in the reference database.

13. The non-transitory computer-readable storage medium of claim 11, wherein a first plurality of the surrogate keys of the plurality of entities in the database after the upgrading are out of sync with a second plurality of surrogate keys of a corresponding plurality of entities in the reference database.

14. The non-transitory computer-readable storage medium of claim 11, wherein at least one of the plurality of entities is created after installation of the first version of the database, and before the upgrading of the database to the second version.

15. The non-transitory computer-readable storage medium of claim 11, wherein the database comprises a relational database.

* * * * *